Nov. 4, 1947.   C. J. COLLOM   2,430,390
CONTROL APPARATUS FOR GAS DISCHARGE TUBES
Filed March 9, 1944
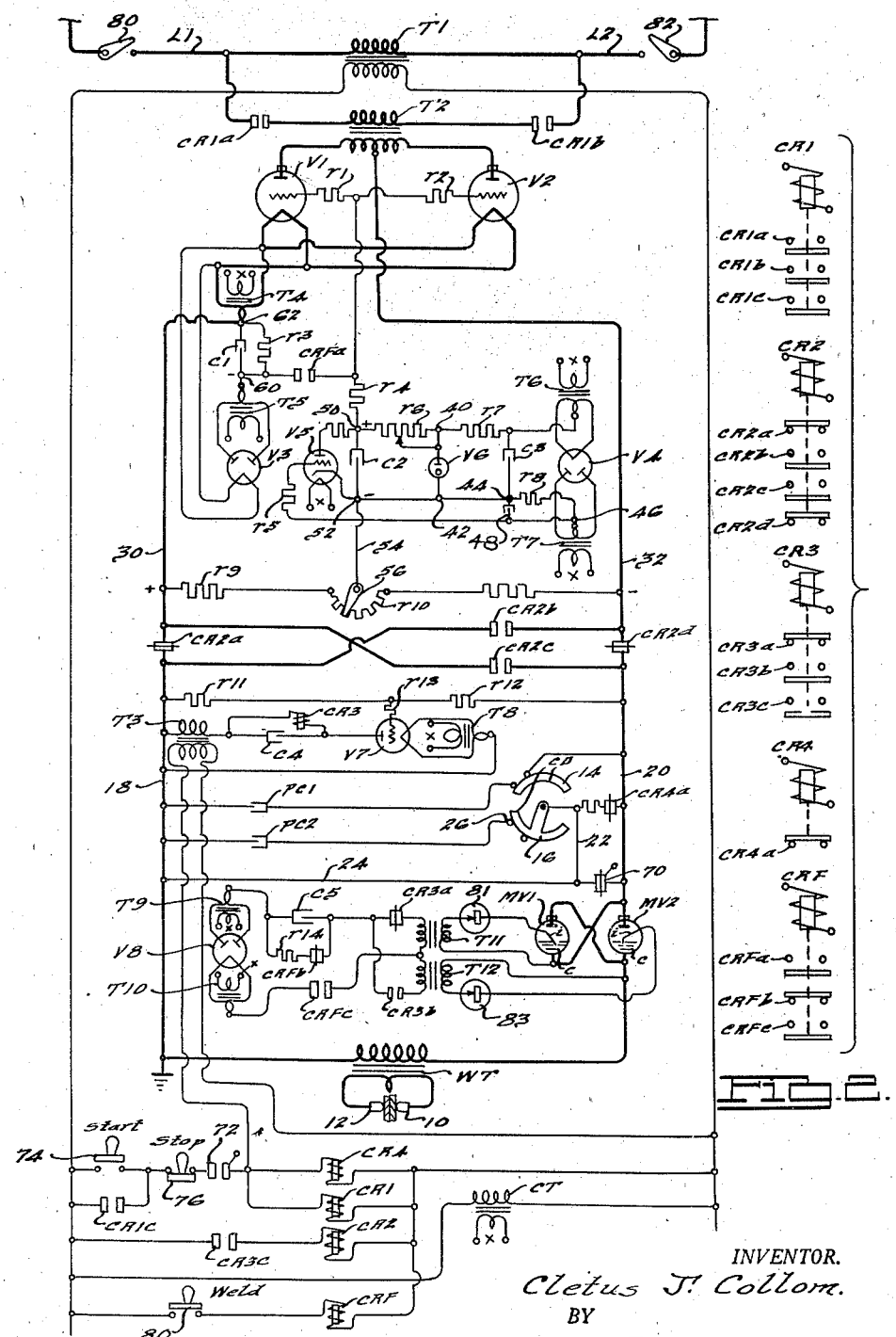

Patented Nov. 4, 1947

2,430,390

UNITED STATES PATENT OFFICE 2,430,390

CONTROL APPARATUS FOR GAS DISCHARGE TUBES

Cletus J. Collom, Detroit, Mich., assignor to Weltronic Company, Oakland County, Mich., a corporation of Michigan Application March 9, 1944, Serial No. 525,734

6 Claims. (Cl. 315—234)

1

The present invention relates to electrical control systems, and as herein disclosed, provides an improved arrangement for firing the controlling rectifiers of a resistance welding system of the condenser discharge type, whereby to initiate a welding operation.

The principal objects of the present invention are to provide an improved arrangement for applying igniting impulses to electric discharge devices; to provide such an arrangement characterized in that the igniting impulse is applied for a very short period of time, compared to the length of time that current flows through the discharge device as a consequence of the application of the igniting impulse.

Other and more detailed objects appear in the following description and in the appended claims.

In the drawings:

Figure 1 is a diagrammatic illustration of a control system embodying the invention;

Fig. 2 is a diagrammatic view showing the mechanical relation between certain switch coils and contacts which are shown separately from each other in Fig. 1.

It will be appreciated from a complete understanding of the invention that, in a generic sense, improvements thereof may be embodied in control system designed for a wide variety of different uses and may also be embodied in various different specific constructions. In an illustrative but not in a limiting sense, the present invention is herein disclosed in connection with a resistance welding system, which system embodies certain features disclosed and claimed in the copending applications of Gustav E. Undy, Serial No. 447,305, filed June 16, 1942, and Serial No. 496,147, filed July 26, 1943.

Referring first to Fig. 1, the electrodes 10 and 12 of an illustrative welding machine are illustrated as being conventionally connected in a closed circuit with the secondary winding of a usual welding transformer WT. The primary winding of transformer WT is connected, in series relation with a pair of reversely connected main electric discharge devices MV1 and MV2, to receive power from an energy storage system herein illustrated as comprising a pair of power condensers PC1 and PC2. A control drum CD is provided to selectively render the condenser PC2 effective or ineffective. This control drum is provided with two segments 14 and 16, which may be simultaneously rotated. In the illustrated position, segment 14 connects condenser PC1 between the welding current leads 18 and 20, whereas segment 16 short circuits condenser PC2 upon itself through conductors 22 and 24, and a portion of conductor 18. It will be appreciated that if the drum CD is rotated counterclockwise sufficiently far to bring segment 14 into engagement with the terminal 26, associated with condenser

2

PC2, the just-mentioned short circuit is interrupted, and condenser PC2 is connected between the leads 18 and 20, in parallel with condenser PC1.

The above-mentioned main discharge devices may be of any suitable type, but are illustrated herein as being of the immersed igniter-mercury pool type sold commercially under the trade name "ignitron." As is well known, these valves are normally non-conductive, but become conductive if an igniting potential is applied thereto while the anodes thereof are positive.

In accordance with the present invention, the firing circuits for the main rectifiers MV1 and MV2 comprise transformers T11 and T12, the secondary windings whereof are connected, respectively, between the igniters $i$ and the cathodes $c$ of main rectifiers MV1 and MV2. The primary windings of transformers T11 and T12 are arranged to receive energy from a direct current source comprising transformer T9 and rectifier V8. These primary winding circuits include back and front contacts CR3a and CR3b of the hereinafter described control relay CR3. This relay is controlled in accordance with the polarity of the main condensers, and serves to determine which of the main rectifiers is to be fired in order to initiate a particular welding cycle. The just-mentioned primary winding circuits also include a normally open contact CRFc of the hereinafter described firing relay CRF. This contact is closed in order to initiate a welding operation and enables the source comprising rectifier V8 to pass a surge current, of very short duration, through one or the other of the transformers T11 and T12, depending upon the position of relay CR3. The secondary voltage developed by transformer T11 or T12, as the case may be, is consequently of very short duration, being a very minor fraction of a half cycle of an alternating current source of commercial frequency.

As described below, an operation of relay CR3 takes place at an intermediate stage of each welding operation, which transfer interrupts the circuit for one of the transformers T11 and T12 and completes the circuit for the other. In order to limit the length of each surge current and to also prevent this transfer from subjecting the rectifiers MV1 and MV2 to a false firing impulse, means are provided which limit the length of each surge and prevent, until reset, a further flow of surge current from the source comprising rectifier V8. As shown, this means includes condenser C5, which, as will be understood, permits the initial surge, but becomes fully charged considerably ahead of the above-described transfer action of relay CR3 and so blocks the direct current circuit. In order to discharge condenser C5, the firing relay is provided with a back contact CRFb, which closes at the conclusion of each welding operation and enables condenser C5 to discharge through a resistor r14. Relay CRF is so constructed that the opening of contact CRFc precedes the reclosure of contact CRFb.

As mentioned above, in the present system the power condensers PC1 and PC2 are charged to alternately opposite polarities. This enables the reactive energy stored in the welding circuit during the making of the weld to be returned to and partially recharge the power condensers. With this relation, accordingly, successive welds are initiated by alternately firing the main devices MV1 and MV2, device MV2 being fired under conditions when the main welding conductor 20 is positive and device MV1 being fired under conditions when the main welding conductor 18 is positive.

The previously mentioned control switch CR3 and an associated network comprising valve V7 are utilized to respond to the polarity of the power condensers and to, consequently, determine which of the main discharge devices MV1 and MV2 is to be fired. As shown, switch CR3 is connected in series with the secondary winding of a normally energized transformer T3, through the anode circuit of valve V7. The grid of valve V7, which may be of a usual gas-filled, discontinuous control type, is connected to line 18 through resistors r11 and r13 and is connected to line 20 through resistors r13 and r12. The cathode of valve V7, in turn, is connected directly to line 18. With this relation, it will be appreciated that so long as the polarity of the power condensers is such that line 18 is positive, the grid of valve V7 is negative with respect to the cathode. This action renders valve V7 non-conductive and maintains switch CR3 in a de-energized condition. Under these conditions, accordingly, contact CR3a of switch CR3 is closed, preparing a circuit by which the source comprising rectifier V8 may be connected to energize transformer T11, associated with the main discharge device MV1. Under the same conditions, contact CR3b of switch CR3 is open, thereby preventing the energization of transformer T12, associated with the other main discharge device MV2. On the other hand, so long as the polarity of the power condensers is such that line 20 is positive, the grid of valve V7 is positive relative to the cathode, which action enables transformer T3 to maintain switch CR3 in the energized condition. Under these conditions, the positions of contacts CR3a and CR3b are reversed, isolating transformer T11 from the source of firing current and preparing a circuit through which it may be connected to transformer T12.

In view of the fact that the power condensers are charged to alternately opposite polarities, the present system utilizes reversing means which are interposed between the source of charging current (transformer T2) and the power condensers. The reversing means is shown as comprising a usual electromagnetic switch CR2, having two back contacts CR2a and CR2d and two front contacts CR2b and CR2c. Switch CR2 is controlled by front contact CR3c of the previously - mentioned polarity - responsive switch CR3. As before, under conditions in which the polarity of the power condensers is such that line 18 is positive, switch CR3 remains de-energized. This action maintains switch CR2 in a de-energized condition. Under these conditions, the switch contacts CR2a, etc., occupy the illustrated positions, connecting the positive charging line 30 to the previously-mentioned line 18, and connecting the negative charging line 32 to the previously-mentioned line 20.

In the present system, the power condensers PC1 and PC2 derive charging current from a single phase source L1—L2, through a charging transformer T2 and a full wave rectifier, comprising valves V1 and V2. Valves V1 and V2 may be and preferably are of a usual three-element, gas-filled, discontinuous control type. As will be understood, these valves may be rendered non-conductive by maintaining the grids negative with respect to the cathodes. If, however, the grids are rendered neutral or positive with respect to their associated cathodes in half cycles in which the anodes are sufficiently positive with respect to the cathodes, they become conductive and remain so for the balance of the corresponding half cycle of current flow.

A feature of the present system resides in progressively decreasing the charging rate of the main condensers as the fully charged condition thereof is approached, so as to eliminate any possibility of charging the power condensers to a voltage in excess of a value appropriate to the welding operation. As shown, this progressive variation is accomplished by phase shifting means, which responds to the voltage of the power condensers, and serves to correspondingly delay the points, in successive half cycles of the source, at which valves V1 and V2 are rendered conductive.

More particularly, the above phase shifting apparatus includes an oscillator circuit comprising a control condenser C2 which is charged to the indicated polarity, and is discharged through the associated valve V5, once during each half cycle of the source. A suitable source of charging current for condenser C2 is illustrated as comprising a network including a usual voltage regulating glow discharge valve V6, and a full wave rectifier, comprising valve V4 and transformer T7. It will be recognized that during each half cycle, transformer T7, through valve V4, impresses a voltage across valve V6 which is equal to the output voltage of transformer T7, less the voltage drops across the associated resistors r7 and r8. For purposes of description, the network may be regarded as being in a de-energized condition at the time the system is initially placed in service and transformer T7 may be regarded as being initially energized at the zero point of its voltage wave. Under such conditions, the voltage impressed across valve V6 through rectifier V4 rises sinusoidally until a value is reached at which valve V6 breaks down. For example, assuming transformer T7 has a maximum voltage of approximately 600 volts, valve V6 may have a break-down voltage of 180 volts. As soon as valve V6 breaks down, the voltage drop across it falls to a value just sufficient to maintain a discharge therethrough, for example, 150 volts. During the first half of the half cycle in question, condenser C3 charges to a potential of, for example, 500 volts. At or about the beginning of the last half of the half cycle in question, the energy stored in condenser C3 starts to discharge through valve V6 and resistor r7. The timing of this discharge circuit is such that the potential of condenser C3 remains equal to, or in excess of, the value needed to maintain a discharge through valve V6 until such a point, in the next half cycle, that the voltage of transformer T7 attains a value sufficient to maintain a discharge through valve V6. When such point is reached, transformer T7 is again effective to supply charging current to condenser C3. After its initial breakdown in the initial half cycle, accordingly, valve V6 is continuously supplied with potential of a value sufficient to maintain a discharge through it, and valve V6 is, consequently, continuously effective to maintain, between terminals 40 and 42, a substantially fixed potential equal to the just-mentioned discharge-maintaining value.

Condenser C2 is coupled across terminals 40 and 42, through a potentiometer r6, which may be adjusted to determine the charging rate of condenser C2 and to, consequently, determine the maximum voltage to which condenser C2 is charged in the course of each half cycle. In the present system, the charging rate is preferably adjusted so that condenser C2 requires substantially a full half cycle in which to reach the full potential between terminals 40 and 42.

The discharge of condenser C2 takes place, substantially instantaneously, through the previously mentioned valve V5, which may be and preferably is of the usual three-element, gas-filled, discontinuous type. As illustrated, the grid of valve V5 is coupled, through a resistor r5, to terminal 46, being the center tap of the rectifier transformer T7. The cathode of valve V5, in turn, is coupled to the terminal 46 through resistor r8. It will be appreciated that so long in each half cycle as the voltage of transformer T7 is high enough to enable it to transmit current through the circuit, including valve V6 and resistors r7 and r8, the potential drop across resistor r8 is such as to render the grid of valve V5 negative with respect to the cathode thereof. Towards the close of each such half cycle, however, the output of transformer T7 falls to a value too low to maintain the just-mentioned flow of current. At the instant that this current flow through resistor r8 ceases, the potential drop across resistor r8 disappears, which action renders the grid of valve V5 neutral with respect to the cathode thereof and enables condenser C2 to discharge through valve V5. It will be understood that this discharge takes place substantially instantaneously. In accordance with usual oscillator practice, also, the slight amount of reactive energy stored in this discharge circuit momentarily renders the cathode of valve V5 positive with respect to the anode, thereby stopping the discharge.

The ratio of the maximum potential of transformer T7 and the voltage needed to maintain a discharge through valve V6 is preferably such that current flow through the biasing resistor r8 is maintained until a point which is very near the end of each half cycle, in which event, for all practical purposes, condenser C2 may be regarded as being in a fully discharged condition at the beginning of each half cycle and may further be regarded as being discharged at the end of each half cycle. If it is desired to precisely synchronize the discharge of condenser C2 with the voltage of transformer T7 so as to insure that the charging action of condenser C2 begins precisely at the beginning of each half cycle, an auxiliary condenser 48 may be connected across resistance r8, the energy whereof serves to maintain the biasing current through resistor r8 for an appropriate time after the potential of transformer T7 has fallen to too low a value to maintain such biasing current.

It will be noticed that transformer T7 becomes effective at or immediately adjacent the beginning of each half cycle, which follows a discharge of condenser C2, to again impress the biasing potential across resistor r8. If the discharge of condenser C2 is precisely synchronized with the voltage of transformer T7, condenser C2 is in a fully discharged condition at the zero point of the voltage wave of transformer T7 and, consequently, as soon as the voltage of transformer T7 attains a value sufficient to pass current through rectifier V4, it is enabled to pass current through condenser C2 and resistor r8. If the timing of condenser C2 is such that its discharge slightly precedes the end of each half cycle, the just-mentioned biasing current through resistor r8 would not begin until a slightly higher potential had been attained by transformer T7. The critical anode-cathode voltage of valve V5 is such, however, that the just-mentioned biasing current is re-initiated well before such anode-cathode voltage is attained.

It will be appreciated from the foregoing, accordingly, that at the beginning of each successive half cycle of the source, condenser C2 is in a discharged condition, that the charge thereon gradually rises during the course of each such half cycle and at the end thereof, condenser C2 rapidly discharges.

Considering now the manner in which the potential across condenser C2 controls the conductivity of valves V1 and V2, it will be noticed that the grid of valve V1 is connected to the positive terminal 50 of condenser C2, through resistors r4 and r1, and that the grid of valve V2 is connected to terminal 50, through resistors r4 and r2. The cathodes of valves V1 and V2, on the other hand, are connected to the negative terminal 52 of condenser C2, through conductor 30, resistor r9, a portion of resistor r10 and conductor 54. It will be noticed that the circuit containing resistors r9 and r10 is connected directly between the positive and negative charging lines 30 and 32, which lines, during charging periods, are connected, through one or the other sets of contacts of switch CR2, directly across the power condensers PC1 and PC2. Thus, the potential difference between the cathodes of valves V1 and V2 and the negative terminal 52 of condenser C2 is proportional to and determined by the charge on the power condensers PC1 and PC2, the proportionality between these potentials being determined by the setting of arm 56 along resistor r10. In turn, except when the hereinafter described biasing potential of resistor r3 is effective, the grid-cathode potentials of valves V1 and V2 are at all times equal to the difference between the last-mentioned potential difference and the potential of condenser C2.

If the power condensers PC1 and PC2 are fully discharged, terminal 52 and the cathodes of valves V1 and V2 have the same potential and, consequently, the grid-cathode potentials of these valves are determined entirely by the charge on condenser C2. In such event, the initial recharging of condenser C2, which takes place at the beginning of each half cycle, is sufficient to bring the grids of valves V1 and V2 either neutral or positive with respect to the cathodes. This action, in turn, renders these valves conductive at or near the beginning of the corresponding half cycles of voltage impressed thereacross by the supply transformer T2, it being assumed that the potentials involved are in phase with each other and that the current through valves V1 and V2 is in phase with the voltage of transformer T2. The flow of current through valves V1 and V2 gradually builds up a charge across the power condensers PC1 and PC2, which potential renders the cathodes of valves V1 and V2 pregressively more positive with respect to the terminal 52 of condenser C2. Under such conditions, the condenser C2 is unable to render the grids of valves V1 and V2 neutral or positive with respect to their cathodes until such time as the potential of condenser C2 exceeds the potential difference between terminal 52 and the cathodes of these valves. The points in successive half cycles at which valves V1 and V2 are rendered conductive are thus delayed more and more as the charge on the power condensers PC1 and PC2 increases.

As will be appreciated, the gradually increasing potential between terminal 52 and the cathodes of valves V1 and V2 ultimately attains a value which is not matched or overcome by the potential of condenser C2 until a time which is so late in a half cycle that the anode potential applied to the corresponding valve V1 or V2 (depending upon whether the condition in question is attained during a positive or negative half cycle) is too low to cause a break down of such valve. When this condition is attained, valves V1 and V2 cease to pass current to the power condensers and the charging action is complete.

As will be understood, if a portion of the charge on the power condensers PC1 and PC2 should leak off, this action would again bring the potential between the terminal 52 and the cathodes of valves V1 and V2 to a value low enough to enable condenser C2 to refire these valves and again bring the charge on the power condensers up to the value corresponding to the setting of control arm 56.

When a weld is made, the power condensers are discharged through the welding transformer, as described below, which action, of course, promptly lowers the potentials of the power condensers. A further feature of the present invention resides in an improved arrangement for maintaining the valves V1 and V2 in a blocked condition during such discharge. As illustrated, the hereinafter described firing switch CRF is provided with a normally open contact CRFa. This contact normally isolates the grids of valves V1 and V2 from the negative terminal 60 of resistor r3, the positive terminal 62 whereof is connected to the cathodes of valves V1 and V2. A fixed potential in excess of the maximum potential attained by condenser C2 is maintained across resistor r3 by means of transformer T4 and a usual full wave rectifier V3. At the beginning of a welding operation, the firing switch CRF is energized, which action closes contact CRFa and connects resistor r3 between the grids and cathodes of valves V1 and V2, thereby strongly biasing these grids to a negative potential with respect to these cathodes, and effectively blocking them. Contact CRFa remains closed, as described below, until the welding operation is completed, at which time it reopens and enables the successive firing of valves V1 and V2, as aforesaid, together with the consequent recharging of the power condensers.

In the example given above with respect to the charging of the main condensers, it was assumed that at the beginning of the charging action these condensers were in a fully discharged condition. As described below, each welding operation partially recharges the condensers to an intermediate value corresponding, for example, to between thirty and fifty per cent of the fully charged value. A recharging action of the power condensers, which immediately follows a welding operation, is begun at an intermediate phase shift point of the valves V1 and V2, instead of at the zero phase shift point.

The illustrated system employs a series of five control switches, certain of which are mentioned above. These elements are of a usual electromagnetically operated type, the contacts whereof occupy the positions illustrated in the drawing when the coils are de-energized, but move to and remain in an opposite position when and so long as the coils are energized. The mechanical relation between these coils and contacts is shown in Fig. 2.

It is believed the remaining details of the system may best be understood from a description of the operation thereof, it being understood that so long as the system is out of service, all movable elements occupy the positions shown in Fig. 1. Under such conditions, accordingly, power condenser PC1 is in a fully discharged condition, since it is short circuited through the now closed interlock 70 and through the now closed contact CR4a of control switch CR4. Condenser PC2 is out of service and is directly short circuited through conductors 22 and 24. Interlock 70 may correspond, for example, to a usual interlock associated with the door of the cabinet, in which the mechanism is housed and which prevents a welding operation unless and until the cabinet door is closed. A similar normally open interlock 72 is associated with the circuit of the start and stop buttons 74 and 76, and it will be understood that if the cabinet doors are closed, these interlocks 70 and 72 are respectively opened and closed.

Assuming it is desired to prepare the system to make a welding operation, the usual disconnect switches 80 and 82 may be closed, thereby connecting the line conductors L1 and L2 to a usual alternating current source and completing an obvious energizing circuit for the primary winding of control transformer T1. Upon being energized, transformer T1 completes an obvious energizing circuit for the primary winding of the control transformer CT, the secondary terminals whereof bear the reference character $x$. It will be understood that terminals $x$ of transformer CT are permanently connected to the correspondingly designated primary terminals of transformers T4, T5, T6, T7, T8, T9 and T10 and to the cathode of valve V5. The last-mentioned connection, accordingly, brings the cathode of valve V5 to an emissive temperature, conditioning this valve for action. Energization of transformers T4, T6, T8 and T10, in turn, supply valves V3, V4, V7 and V8 with filament current. In addition, transformer T4 supplies the main charging valves V1 and V2 with filament current. These actions condition the corresponding valves for operation, as will be understood. The energization of transformers T5, T7 and T9 applies anode potential to the corresponding valves V3, V4 and V8. In the case of valve V3, this action results in impressing the indicated biasing potential across resistor r3, which action is otherwise without effect, since contact CRFa is now open. In the case of valve V4, this action results in impressing a potential between terminals 40 and 42, which is sufficient to break down valve V6, it being understood, as aforesaid, that valve V6 functions in usual fashion to maintain a constant potential between the terminals 40 and 42. The fixed potential between the terminals 40 and 42 serves, as aforesaid, to charge condenser C2. As aforesaid, also, valve V5 functions at approximately the zero point between successive half cycles of the voltage impressed across lines L1 and L2, to discharge condenser C2. Condenser C2, during each successive half cycle, brings the grids of valves V1 and V2 to positive values, as indicated in Fig. 2. These actions are without effect under present conditions, however, since the charging transformer T2 is de-energized at contacts CR1a and CR1b of switch CR1.

The above-mentioned application of anode potential to valve V8 enables transformer T9 to apply unidirectional potential to the firing circuits, which are now interrupted at contact CRFc, preparatory to the welding operation.

Assuming it is desired to charge up the power condenser PC1, preparatory to the making of a weld, the start button 74 may be closed, which action, through the now closed interlock 72, completes energizing circuits, in parallel, for transformer T3 and for switches CR1 and CR4. Upon being energized, switch CR4 opens its sole contact CR4a and interrupts the remaining discharge circuit for condenser PC1. Upon being energized, transformer T3 applies anode potential to valve V7. Under the conditions stated, lines 18 and 20 are at the same potential and, consequently, the grid of valve V7 is neutral with respect to the cathode thereof. Accordingly, transformer T3 is enabled to pass current through valve V7 (assuming the anode thereof is now positive) and energize switch CR3. Upon being energized, switch CR3 opens its contact CR3a and closes its contacts CR3b and CR3c. This operation of contacts CR3a and CR3b isolates transformer T11 from the source of firing current and prepares a circuit for connecting transformer T12 to such source. The closure of contact CR3c energizes switch CR2, which thereupon opens its contacts CR2a and CR2d and closes its contacts CR2b and CR2c. These actions, as will be obvious, connect the positive charging line 30 to line 20 and connect the negative charging line 32 to line 18. The resulting charging action of the power condenser PC1, described below, will, consequently, bring this condenser to a polarity such that line 18 is negative and line 20 is positive. It will be noticed that condenser C4 serves to maintain switch CR3 energized during negative half cycles of the source, and that so long as line 18 is either neutral or negative with respect to line 20, the grid of valve V7 is either neutral or positive with respect to the cathode thereof. Throughout the charging action now being initiated, and until such time as the polarities of lines 18 and 20 are reversed, accordingly, switch CR3 will remain in the energized condition.

The energization of switch CR1 causes closure of its contacts CR1a, CR1b and CR1c. The latter contact completes a holding circuit in parallel with the start button 74, which may thereupon be released to the open position without effect. Closure of contacts CR1a and CR1b completes an obvious energizing circuit for the charging transformer T2, which thereupon becomes effective to apply anode potentials to the charging valves V1 and V2. It may be assumed, for example, that the energization of transformer T2 takes place at the beginning of a positive half cycle. Under such conditions, transformer T2 renders the anode of valve V2 negative, but renders the anode of valve V1 positive. At the same time, there being no charge on the power condenser PC1, condenser C2 is enabled to immediately fire valve V1 and initiate, at the beginning of such half cycle, a flow of current through valve V1, conductors 30 and 32 and power condenser PC1. It will be understood that if the energization of transformer T2 had taken place instead at the beginning of a negative half cycle, valve V2 would have initiated the charging action. Also, if the energization of transformer T2 had taken place at an intermediate point in a positive or negative half cycle, the initial firing of valve V1 or V2, as the case may be, would have taken place at such intermediate point instead of at the beginning of the corresponding half cycle.

Pursuant to the initial firing of valve V1 or V2, as the case may be, the resultant charging of the power condenser PC1 takes place and ultimately, as described above, the charge on condenser PC1 attains a value corresponding to the setting of the control arm 56, at which time the charging action ceases. The cessation of the charging action leaves the system in such condition, however, as described above, that if the charge on the power condenser PC1 leaks off or is otherwise prematurely dissipated, valves V1 and V2 are again fired sufficiently long to restore the charge on the power condenser.

As will be appreciated, various different control systems may be utilized to actually initiate the making of the weld and in accordance with the disclosure of the aforesaid copending application, such control systems may be interlocked with the charging apparatus in such a way that the weld cannot be initiated unless and until the power condenser is fully charged. In the present case, the switch 80 is illustrative of a manually or automatically operated element, which may be utilized to initiate the weld, and it will be understood that closure of this contact may be interlocked with other apparatus in such a way as to prevent such closure unless and until the work is properly engaged between the electrodes. The switch 80 may also be maintained closed by automatic means which afford a desired definite timing interval, sufficient to allow for the cycle about to be described.

Closure of switch 80 directly energizes the firing switch CRF, which thereupon closes its contacts CRFa and CRFc and opens its contact CRFb. The closure of contact CRFa, as aforesaid, couples the grids of valves V1 and V2 to the negative terminal of resistor r3, thereby applying a negative bias to valves V1 and V2, which overcomes the effect of condenser C2 and renders these valves non-conductive. The opening of contact CRFb interrupts the discharge circuit for condenser C5. Closure of contact CRFc connects the primary winding of transformer T12 to the source comprising rectifier V8, through the now closed contact CR3b.

The latter action immediately energizes transformer T12 and enables it to apply an igniting potential between the igniter i and the cathode c of the main discharge device MV2. It will be recalled that in the example now being described, line 20 is positive, and in response to the just-mentioned igniting potential thereof, device MV2 becomes conductive and enables the now charged power condenser PC1 to discharge through the welding transformer and supply welding energy to the welding circuit.

Condenser C5 also receives charging current as a consequence of the closure of contact CRFc and, as aforesaid, the constants of the associated circuit are such that condenser C5 attains a fully charged condition in a very short interval of time corresponding, for example, to a minor fraction of a half cycle of the source. This minor fraction, preferably of the order of from 8 to 10 electrical degrees, being as short as is possible and still insure the firing of the associated main rectifier. As soon as condenser C5 attains the fully charged condition, it blocks further flow of current through transformer T12. The firing action thus subjects transformer T12 to a very brief surge of current. This surge of current has a steep wave front, rising substantially instantaneously from a zero value to a maximum value and thereafter falling off rapidly to a zero value again as condenser C5 charges up. During the period that this current is increasing, a voltage of one polarity is induced in the secondary winding of transformer T12 and during the period that this current is decreasing, a voltage of the opposite polarity is induced in such secondary winding. It is usually preferred to apply between the cathodes and igniters of the aforesaid rectifiers MV1 and MV2 only such potentials as bring the igniters positive with respect to the cathodes. Accordingly, it is preferred to suppress one of the just-mentioned two opposite potentials induced in the secondary winding of the firing transformer. As shown, this is accomplished by introducing a usual rectifier 83 in the secondary circuit of transformer T12. A corresponding rectifier 81 is associated with transformer T11 for the same purpose. It will be appreciated that generically the system may be arranged to suppress either the potential corresponding to an increasing current in the primary of transformer T12, or the potential corresponding to a decreasing current in such primary. Usually it is preferred to utilize the potential corresponding to the increasing current and, consequently, the connections for transformer T12 are such that during the rise of current in the primary of transformer T12, the induced secondary potential of this transformer brings the igniter $i$ of rectifier MV2 positive with respect to its cathode.

By virtue of the reactive character of the welding circuit, the flow of current therethrough, initiated by the aforesaid firing of rectifier MV2, lags the impressed voltage, and after this condenser PC1 has become fully discharged, such reactive energy causes current to continue to flow in the original direction and at least partially recharge condenser PC1 to the opposite polarity. At the conclusion of such current flow, condenser PC1 tends to cause a reverse flow of current through the welding circuit, which reverse current is, however, prevented by rectifier MV2, since its anode is now negative. Such reverse flow is prevented by rectifier MV1 since, although its anode is now positive, no igniting potential exists between its igniter and cathode. The flow of welding current is thus terminated at the conclusion of the just-mentioned single unidirectional surge of current, during which condenser PC1 is initially discharged and is partially recharged to the opposite polarity.

At the beginning of the recharging operation, line 18 is rendered positive relative to line 20. This action, consequently, negatively biases valve V7 and renders this valve nonconductive. As a consequence, switch CR3 resumes the de-energized condition, reopening its contacts CR3b and CR3c and reclosing its contact CR3a. The reopening of contact CR3c de-energizes switch CR2, the four contacts whereof consequently resume the illustrated position, connecting the positive charging line 30 to the now positive line 18 and connecting the negative charging line 32 to the now negative line 20. This action, as will be understood, is preparatory to the re-actuation of valves V1 and V2, described below.

The transfer of contacts CR3a and CR3b disconnects transformer T12 from the source of firing current and connects transformer T11 thereto. These actions are, however, without immediate effect, since, as aforesaid, the initial surge of current from the source of firing current and which served to energize transformer T12, also served to charge up condenser C5 and prevent a further flow of current from the source of firing current.

So long as the weld switch 80 is maintained in the closed position, the system remains in the above described partially recharged condition. Usually, as will be obvious, switch 80 is opened shortly after the operations described above have been completed. The opening of switch 80 de-energizes the firing switch CRF, which thereupon reopens its contacts CRFa and CRFc and recloses its contact CRFb. The transfer of contacts CRFb and CRFc, respectively, completes a discharge cricuit for condenser C5, and interrupts the circuits for transformers T11 and T12.

The opening of contact CRFa eliminates the blocking bias from the grids of valves V1 and V2, enabling the firing of these valves under the combined influences of the potential of condenser C2 and the potential between the terminal 52 and the cathodes of these valves. In view of the now partially charged condition of the power condenser PC1, it will be appreciated, as aforesaid, that the initial firing of valve V1 or V2 (depending upon the polarity of the source at the time contact CRFa opens) is delayed until an intermediate point in the corresponding half cycle.

When the charging action has been completed, as described above, valves V1 and V2 are again blocked off by virtue of the potential between the terminal 52 and the cathodes of these valves. A subsequent welding operation may be initiated and terminated, as before. Such subsequent welding operation proceeds, as before, with the following exceptions. In this case, the energization of the firing switch energizes transformer T11 and fires the main rectifier MV1. This action enables the power condenser PC1 to pass current to the welding circuit in a direction opposite to that initially described and results in partially recharging the power condenser PC1 to a polarity such that line 20 is positive relative to line 18. As soon as, during such recharging, line 20 becomes positive relative to line 18, the grid of valve V7 is rendered positive relative to the cathode thereof. This action enables transformer T3 to re-energize switch CR3, which functions, as initially described, to energize switch CR2, thereby completing the appropriate charging connections between the source and the power condenser, and to prepare the proper firing circuit.

It will be noticed that in the above description of the initial charging operation, following the placing of the system in service, it was assumed that switch CR2 attained its energized position before switch CR1 assumed its energized position. In such case, as aforesaid, the energization of transformer T2 maintained line 20 positive during the initial charging action. The operations which lead to the energization of switches CR2 and CR1 are both initiated at the same time, namely, by the closure of the start button 74 and the above sequence of operation of switches CR2 and CR1 usually obtains. If for any reason the closure of switch CR2 should be delayed until after switch CR1 had closed (and energize transformer T2), transformer T2 would immediately bring line 18 to a positive value relative to line 20. This action would cause switch CR3, if previously energized, to drop out. In dropping out, however, switch CR3 would condition the firing circuits in the proper manner. It is immaterial, therefore, whether the sequencing of switches CR1 and CR2 initially brings line 20 positive with respect to line 18, or vice versa.

Assuming it is desired to shut down the system, the stop button 76 may be momentarily opened, which action de-energizes switches CR1 and CR4 and also de-energizes transformer T3. The latter action results in de-energizing switch CR2. The de-energization of switch CR1 disconnects the charging transformer from the source, and the de-energization of switch CR4 completes a circuit, through its now closed contact CR4a, through which the power condenser PC1 is gradually but relatively promptly discharged. If the cabinet doors are opened while the power condensers are charged, the interlock 72 opens and interlock 70 closes. The former interlock performs the same functions as is accomplished by the opening of the stop button 76 and the latter interlock completes a substantially instantaneous discharge circuit for the power condenser.

Although only a single specific embodiment of the invention has been described, it will be appreciated that various modifications in the form, number and arrangement of the parts may be made without departing from the invention.

What is claimed is:

1. In combination, an electric valve having principal electrodes and a control electrode, said valve being of the type the conductivity whereof may be controlled by the application of a predetermined potential between said control electrode and one of said principal electrodes, means for applying said potential for a predetermined interval including a circuit, means coupling said circuit to said control electrode and said one principal electrode, said circuit including in series relation said coupling means and an energy storage device, and selectively operable means for connecting in series said coupling means and said storage device and a source of electric energy whereby to enable flow of current therethrough and establish said potential between said electrodes, the flow of said current serving to charge said storage device whereby said storage device blocks said flow of current at the expiration of said predetermined interval and prevents said source from maintaining said potential.

2. The combination of claim 1 wherein said valve is of the type in which said one principal electrode comprises a mercury pool and said control electrode is immersed in said pool.

3. In an ignition system, an electric valve having principal electrodes and a control electrode, said valve being of the type the conductivity whereof may be controlled by the application of a predetermined potential between said control electrode and one of said principal electrodes, means for applying said potential for a predetermined interval including a circuit, means coupling said circuit to said control electrode and said one principal electrode, said circuit including in series relation said coupling means and a condenser, and selectively operable means for connecting in series said coupling means and said condenser and a source of electric energy whereby to enable flow of current therethrough and establish said potential between said electrodes, the flow of said current serving to charge said condenser whereby said condenser blocks said flow of current at the expiration of said predetermined interval and prevents said source from maintaining said potential.

4. In an electrical control system, the combination of a pair of translating devices, a normally open circuit for delivering current to said devices, selectively operable means for coupling said devices to said circuit one at a time, means actuable to close said circuit, and means controlled by a said actuation of said closing means to limit the consequent current flow through the coupled device to a predetermined period and to thereafter prevent until reset the flow of current through said circuit, said last-mentioned means including a current storage element disposed to receive charging current as a consequence of the said actuation of said closing means.

5. In an electrical control system the combination of a pair of translating devices, a normally open circuit for delivering current to said devices from a source of electrical energy, selectively operable means for coupling said devices to said circuit one at a time, means actuable to close said circuit and means controlled by said actuation of said closing means to limit the consequent current flow through the coupled device to a predetermined period and to thereafter prevent until reset another said flow of current, said last-mentioned means including a current storage element disposed in series circuit with said coupled device and said source, said storage element being operable to receive charging current as a consequence of the said actuation of said closing means.

6. In an electrical control system the combination of a pair of translating devices, a normally open circuit for delivering current to said devices from a source of electrical energy, selectively operable means for coupling said devices to said circuit one at a time, means actuable to close said circuit and means controlled by said actuation of said closing means to limit the consequent current flow through the coupled device to a predetermined period and to thereafter prevent until reset another said flow of current, said last-mentioned means including a current storage element disposed to receive charging current as a consequence of the said actuation of said closing means, said current storage element acting to determine the magnitude of said predetermined period.

CLETUS J. COLLOM.

REFERENCES CITED

The following references are of record in the file of this patent:

UNITED STATES PATENTS

| Number | Name | Date |
| --- | --- | --- |
| 2,278,431 | Klemperer | Apr. 7, 1942 |
| 2,359,144 | Myers | Sept. 26, 1944 |
| 2,242,942 | Diamond | May 20, 1941 |
| 2,242,948 | Gullicksen | May 20, 1941 |
| 2,316,566 | Constable | Apr. 13, 1943 |
| 2,353,980 | Weisglass | July 18, 1944 |
| 2,023,631 | Wright | Dec. 10, 1935 |
| 2,024,019 | Wright | Dec. 10, 1935 |
| 2,077,600 | Watson | Apr. 20, 1937 |
| 2,120,565 | Lord et al. | June 14, 1938 |